Nov. 1, 1966 M. BENDER 3,281,880
DEVICE FOR RAISING AND LOWERING HEAVY LIDS
Filed Feb. 5, 1964 5 Sheets-Sheet 2

INVENTOR
Martin Bender
by Michael J. Striker
Attorney.

Nov. 1, 1966 M. BENDER 3,281,880
DEVICE FOR RAISING AND LOWERING HEAVY LIDS
Filed Feb. 5, 1964 5 Sheets-Sheet 4

INVENTOR
*Martin Bender*
by *Michael J. Striker*
*Attorney.*

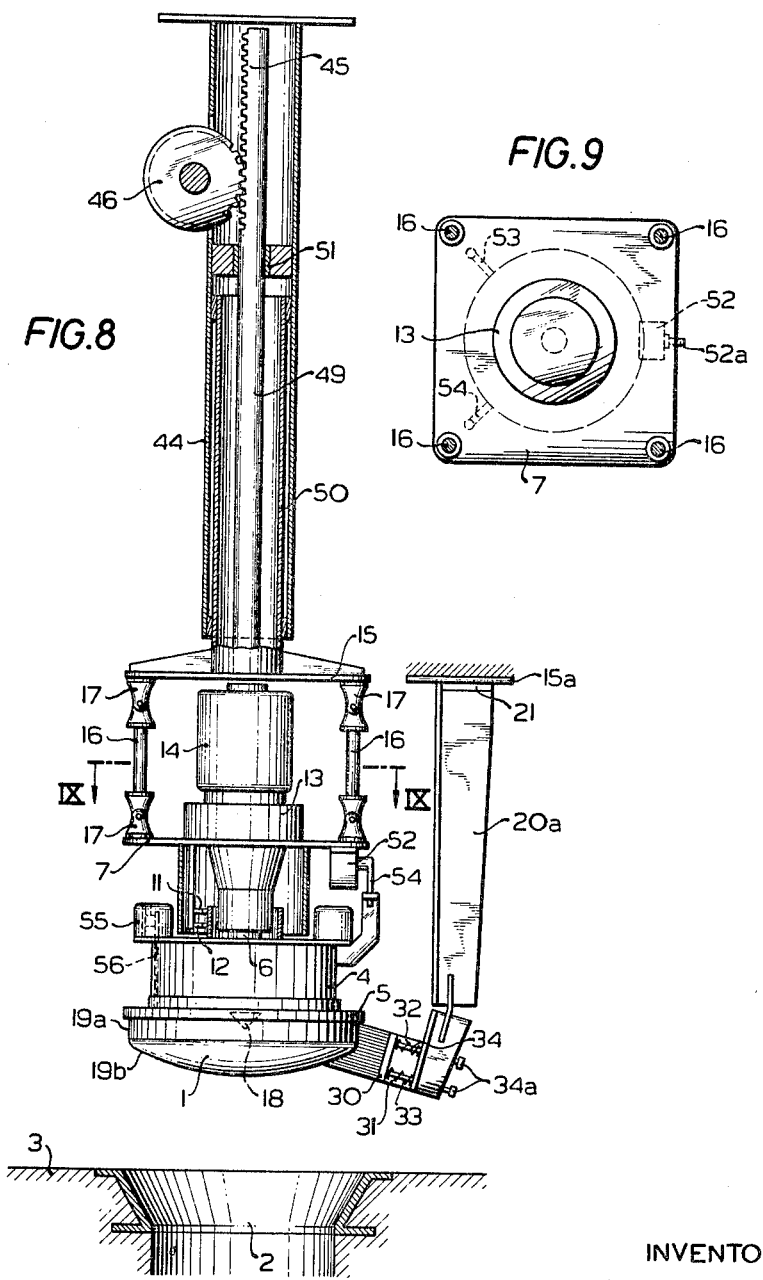

United States Patent Office 3,281,880
Patented Nov. 1, 1966

3,281,880
DEVICE FOR RAISING AND LOWERING
HEAVY LIDS
Martin Bender, 29 Krippstr., Dusseldorf, Germany
Filed Feb. 5, 1964, Ser. No. 342,605
11 Claims. (Cl. 15—93)

The present invention relates to an improved device for lifting a heavy lid and lowering it into place. The device is particularly suitable for raising and lowering the lids for example of coke ovens.

A device for raising and lowering the lids for the charging apertures of horizontal-chamber coke ovens is known, the device comprising a lifting magnet, that pole surface thereof which is adapted to the surface of a charging hole lid being vertically movable relatively thereto. The lid is in the form of two parts which are disposed one below another and which are adapted to close the oven-charging aperture and which are interconnected by a physically moving articulation. When the lid is in the closed state, a plate projects upwards beyond the plane of the oven crown and is screwed to the top part of the lid. In operation, the lid may readily tilt when lowered onto the charging hole, so that the gases evolved in the oven chamber can escape to atmosphere through the gaps between the respective sealing surfaces of the lid and of the charging-hole aperture. Also, uneven deposits of tar, graphite and soot on the seating surfaces of the charging hole and of the lid cause leaks even though the lid is correctly positioned on the charging hole.

The present invention obviates these disadvantages. According to the present invention there is provided a device for lifting a heavy lid and lowering it into place comprising means for releasably holding the lid, means for rotating the lid about a vertical axis, means for ensuring that the plane of the lid is always substantially horizontal, even when the vertical axis of the lid is horizontally displaced from the central axis of the device, and means for raising and lowering the lid and the said associated means.

Preferably said means for holding the lid comprises an electromagnet.

Preferably also means are provided to ensure that said holding means is centered on said lid.

Preferably also means are provided to clean the seating surface of said lid.

An embodiment of the invention is more particularly described with reference to the accompanying drawings in which FIGURE 1 illustrates a magnetic device for raising and lowering the charging-hole lids of horizontal-chamber coke ovens;

FIGURE 8 is an elevational view, partly in section, of the inventive device. This figure shows the cooperation of various elements illustrated in FIGS. 2, 6 and 7; and FIGURE 9 is a section through a portion of FIGURE 8 on the line IX—IX thereof, showing the position of automatic means for reversing the direction of rotation of the magnet.

Figure 1:
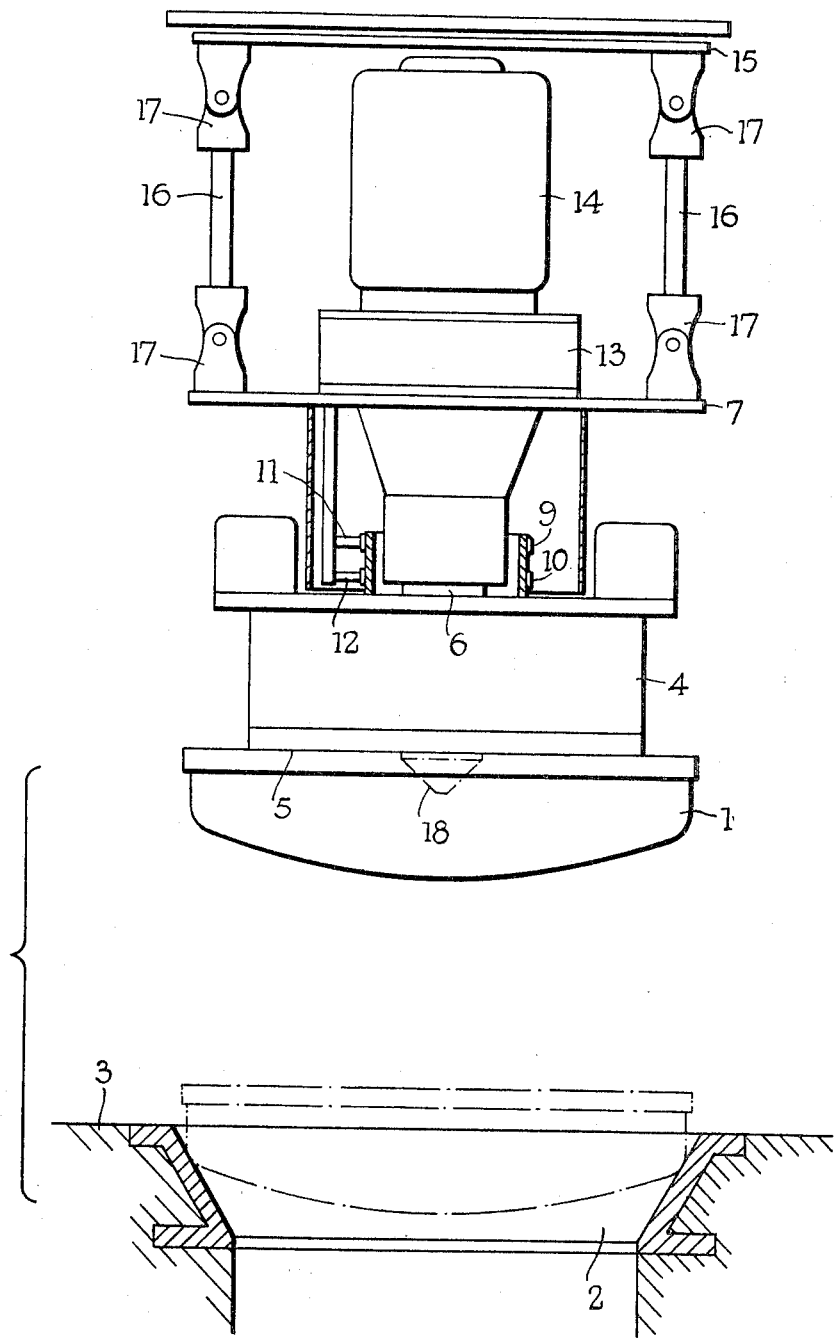

Referring to the drawings, more particularly to FIGURE 1, an embodiment of a magnetic device for raising and lowering the charging-hole lids of horizontal-chamber coke ovens is illustrated which comprises a lid 1 for a charging hole 2 of a horizontal-chamber coke oven 3. A round magnet 4 having a plane pole surface 5, can be lowered onto and raised from the lid 1, the same having a plane top. The magnet 4 is so suspended that if it is displaced sideways its pole surface 5 remains in a substantially horizontal position; it is also arranged to rotate around its spindle 6 which is perpendicular to the pole surface. Consequently, the lid 1, even though in a position eccentric of the lifting magnet, can be simultaneously rotated as it is raised from and lowered onto the hole 2. This rotation of the lid 1 by the magnet has a "grinding-in" action on the lid seat and helps to remove deposits of tar and graphite or the like or at least to distribute such deposits so uniformly that the lid enters into a sealing-tight engagement with the hole.

Disposed in the centre of a plate 7 is a reduction transmission 13 for transmitting to the shaft 6 the rotation of a driving motor 14 which co-operates with such transmission onto which it is coaxially flanged. Conveniently, the motor 14 is an electric driving motor, for instance, a reversible squirrel-cage motor. The shaft 6 is therefore so connected to the magnet 4 as to rotate solidly therewith; also, the shaft 6 is so mounted as to be rotatable relatively to the hanging bearing formed by the plate 7, but secured against axial thrust.

The windings of the magnet 4 are connected to a D.C. source (not shown) through slip rings 9, 10 and associated spring contacts 11, 12.

The plate 7 is freely suspended on a vertically movable bearing frame 15 by means of four articulated rods 16 ecah of the same length, the rod ends being articulated to the bearing frame 15 and to the plate 7 by universal joints 17. These universal joints are uniformly distributed around the circumference of an imaginary circle concentric of the axis of magnet rotation. Of course, only three articulated rods need be used instead of the four shown; the three rods are likewise disposed at equal intervals around a common circle coaxial of the shaft 6. In this particular embodiment the universal joints 17 are knuckle joints but can be ball joints.

The two universal joints 17 associated with each articulated rod 16 are disposed very far apart from one another —i.e., very near the plate 7 and frame 15 respectively— to enable the plate 7, and therefore the magnet 4, to have as much space as possible for pivoting relative to the frame 15. As the drawings show, therefore, the substantially horizontal plate 7, and the magnet 5 parallel therewith, can move physically by an amount determined by the length of the rods 16. Consequently, even if the magnet 4 is in an eccentric position relatively to the lid 1, the latter can be engaged on its seat in the charging hole by being rotated by the magnet.

To heighten this effect, the magnet pole surface 5 has in its central part a centering cone 18 in the form of a number of telescopically engaging elements which are of different lengths and which, in the event of the magnet settling on the lid so that the extension is eccentric of a centering aperture in the lid, can be pressed into the magnet. In the event of the magnet settling centrally on the lid, the centering cone engages in the centering aperture in the centre of the lid, the last-mentioned aperture corresponding substantially to the greatest diameter of the centering cone. A centering cone is not required in most cases since the lid can be engaged reliably in the charging hole even though the magnet may be in a position eccentric of the lid.

As will be apparent, the bearing framework 15 for the magnet 4 can be disposed on a truck adapted to move independently along the oven crown or it can be disposed in some appropriate fashion on the underside of an oven-charging truck.

The electric circuitry for operating the magnet 4 and the circuitry for operating the magnet-rotating motor 14 can of course be controlled in dependence upon the control of the oven-charging truck. For instance, each oven chamber can have associated with it, a stop or abutment or the like which automatically stops the electric drive of the charging truck, whereafter the bearing frame for the magnet descends and a timing relay starts to supply current to the magnet when the same strikes the lid 1 whereby the plunger 56, of a switch 55 mounted in a suitable position, for instance on the magnet 4, is depressed by the lid 1 and closes the circuit of switch 55, thereby supplying current to the motor. The magnet then starts to rotate when the motor 14 is started. The lid 1 is then lifted off the hole 2 while rotating.

If required, the lid-moving device according to the invention can have, in the region of a seating surface 19a, 19b of the lid 1, at least one cleaning device for cleaning the lid seating surface when the lid is being rotated by the magnet. For instance, cleaning devices spaced at substantially equal intervals around the lid periphery can be provided near the lid seating surface 19a, 19b.

Figure 2:
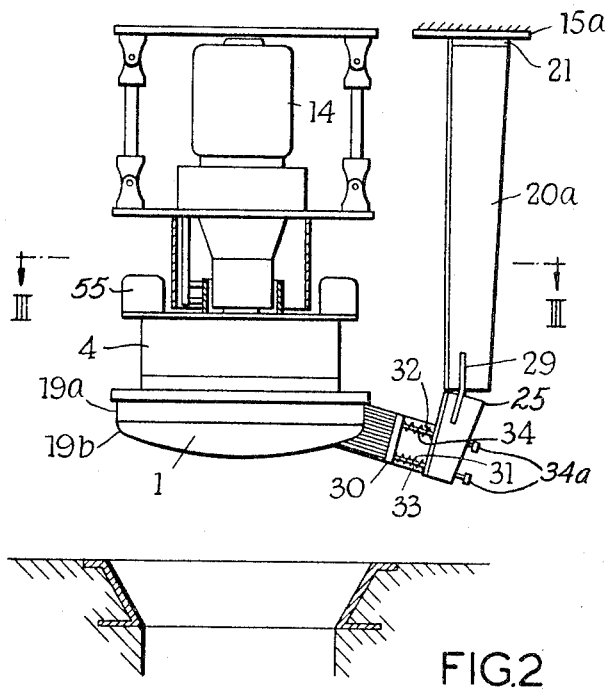
FIGURE 2 illustrates the device illustrated in FIGURE 1 together with a cleaning device for the lid seating surface.
Figure 3:
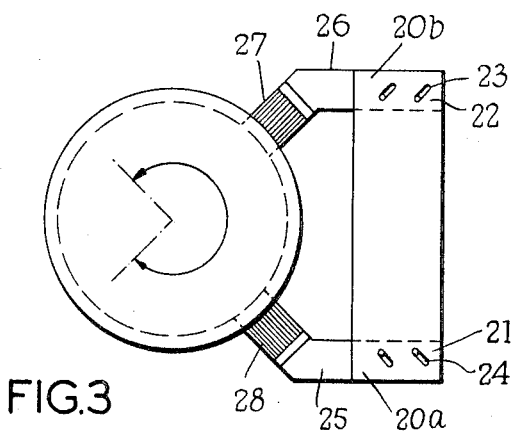
FIGURE 3 is a top plan view of an embodiment largely similar to FIGURE 2 but having slightly modified brush-mounting means.

Alternatively, the magnet-rotating motor 14 can be adapted to be reversed, either automatically or under manual control, after having travelled through a predetermined angle of rotation, for instance, of 270°; in this case as shown in FIGURES 2 and 3 the cleaning devices near the lid periphery are at such a spacing from one another that the seating surface can be cleaned over its whole periphery when the lid performs its reciprocating rotation. An example of an automatic control for this purpose is shown in FIGS. 8 and 9 where a switch 52 is secured to the underside of plate 7 with its actuating lever 52a projecting beyond the switch housing. Stop members 53 and 54 are secured to the electromagnet means and are turnable with the same so that they alternately engage the lever 52a, thereby actuating the switch and causing the motor 14 to be reversed.

Figure 4:
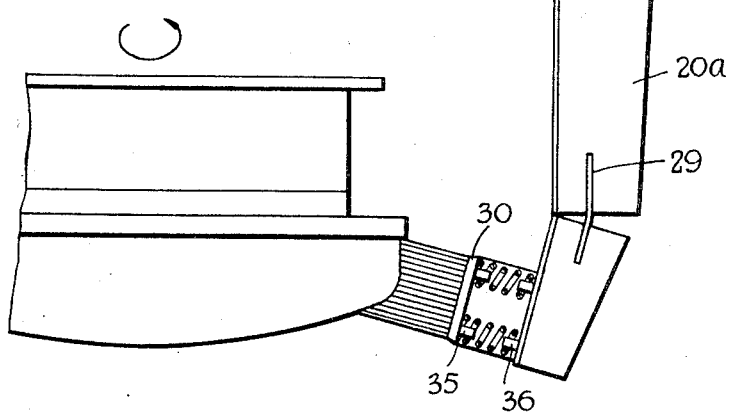
FIGURES 4 and 5 illustrate details of devices for pressing cleaning elements against the lid seating surface.

In FIGURES 2, 4, the cleaning devices are in the form of fixed arms 20a, 20b connected to the bearing frame 15 or to the running frame of the charging truck; a spring element 29 which interconnects the arms 20a, 20b maintains the cleaning devices in resilient engagement with the seating surface of the lid 1 when the same has been raised by the magnet 4. The arms 20a, 20b are secured, through the agency of bearing parts 21, 22 and of screws, in slots 23, 24 in the bearing frame 15 or in the charging-truck frame. At the bottom ends of the arms are retaining elements 25, 26 adapted to receive the actual cleaning elements, such as scratch or wire-braid pads 27, 28, scrapers or the like.

Conveniently, the scraping or shaving devices are in the form of a casing in which a scratch pad 27, 28 is resiliently and replaceably mounted.

Bearing plates 30 for the pads 27, 28 can also be borne resiliently, in a direction perpendicular to the seating surfaces 19a, 19b, by compression springs 31, 32. If required, the plates 30 can be guided by pins 33, 34 which are disposed inside the springs 31, 32 and one of whose ends is secured to the plates 30 on the side remote from the seating surface, the other end of the pins extending freely through the retaining elements 25, 26 respectively. Conveniently, the pin free end extending through each of the retaining elements has a washer or screw or the like to limit the movement of the plate 30.

FIGURE 4 is a view to an enlarged scale showing the resilient arrangement of the cleaning device illustrated in FIGURE 2, like references denoting like elements. In contrast to the embodiment previously described, the springs have their ends guided on pins 35, 36 which are secured in pairs coaxially and in spaced relationship to respectively the plate 30 parallel with the direction of movement thereof, and to the opposite stationary part.

Figure 5:
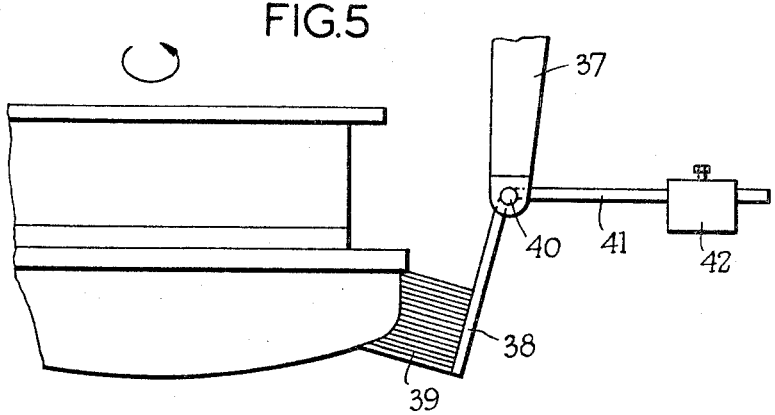

In the embodiment of a cleaning device illustrated in FIGURE 5, the free end of an arm 37 has articulated to it a plate 38 which bears a cleaning element 39 and which is connected via a swivel joint 40 to a lever arm 41, a counterweight 42 being so disposed on the arm 41 as to be displaceable and adjustable. Adjustment of the weight 42 therefore varies the pressure with which the cleaning element 39 is applied to the lid seating surface.

Figure 7:
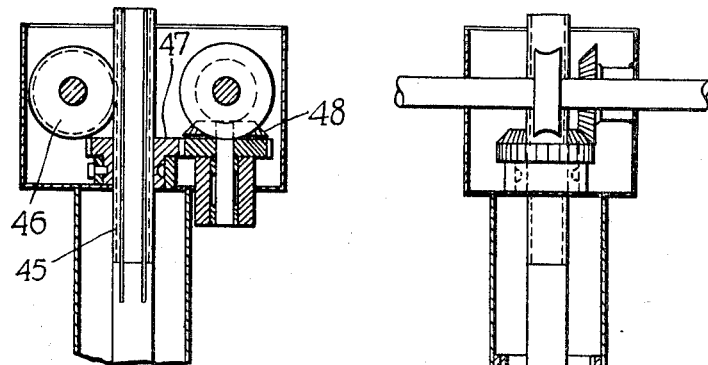
FIGURE 7 is a partly sectioned side elevation corresponding to FIGURE 6.
Figure 6:
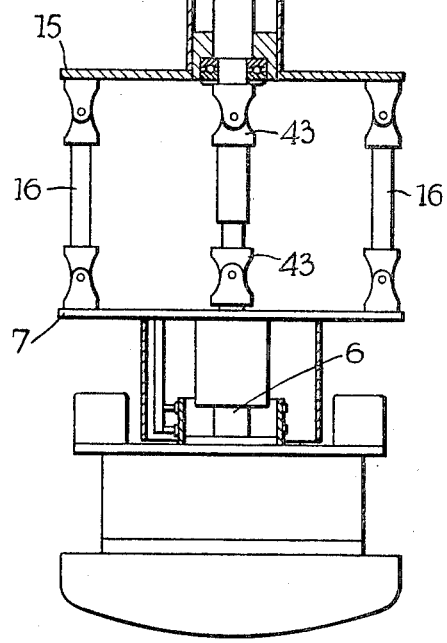
FIGURE 6 is a view, partly in longitudinal section, of another embodiment of a magnetic raising and lowering device.

In the embodiment illustrated in FIGURES 6 and 7, the magnet shaft 6 has two knuckle joints 43 at the same height as the articulated rods 16. The top part of the shaft 6 is mounted in a guide 44 and adapted to be lowered by means of a geared drive comprising a toothed rack part 45 engaged by a gear 46. A driving pinion 47 connected via a transmission 48 to a driving motor is coupled with the shaft 6 with provision for relative axial movement. As a result all the devices for raising and lowering and at the same time rotating the charging-hole lids of a coke oven which are disposed on a single charging truck can be connected to a single common driving motor. In the event of the magnet being lowered onto the lid eccentrically of the charging-hole axis, it may be possible, if the area of adhesion between the magnet and the cover is adequate, for the lid to be lifted without being rotated. When the lid is rotated as it is lifted, this alone grinds deposits away from the seating surfaces.

When the magnet is rotated after it has settled eccentrically on the lid, the magnet, and with it the universally suspended plate 7, rotate in a circle which is concentric of the charging-hole axis and whose radius corresponds to the distance of the magnet shaft from such axis. When the lid releases from the charging hole, the magnet shaft forms the centre of rotation; consequently, the lid sticking to the magnet describes around the longitudinal axis of the magnet shaft a circle whose radius corresponds to the distance between, on the one hand, the longitudinal axis of the magnet shaft and, on the other hand, the vertical main axis of the charging-hole lid.

Since this distance corresponds to the distance referred to between the magnet shaft longitudinal axis and the charging-hole axis, and since due to the charging-hole aperture widening conically upwards, there is a space between the underside of the lid and the top edge of the charging-hole, the lid, when lowered after its first efforts at engagement with the conical edge, is bound to become centered with increasing accuracy relative to the charging-hole axis as it continues its descent, such axis now forming the centre of rotation. The magnet in these conditions, as it were, "orbits" the charging-hole axis with a planetary motion, the seating surfaces of the charging-hole and of the lid therefore are cleaned, and a tight fit between the lid and the hole is ensured. Conveniently, the speed of magnet rotation is from some 10 to 30 r.p.m. Of course, if the speed of magnet rotation and the diameter of the charging-hole lid and of the charging-hole are appropriate, the charging-hole profile can be cylindrical.

What I claim is:

1. Apparatus for manipulating a lid of an industrial oven comprising, in combination, upper support means; lower support means downwardly spaced from said upper support means; means swingably suspending said lower support means from said upper support means for maintaining the former in a substantially horizontal position; motor means on said lower support means and having a rotatable driveshaft having a lower end; and electromagnetic means secured to said lower end of said driveshaft and having a lower face adapted for releasably electromagnetically gripping said lid, said electromagnetic means being rotatable with said driveshaft about a substantially vertical axis whereby to facilitate the removal of deposits from a seating surface of said lid.

2. Apparatus for manipulating a lid of an industrial oven comprising, in combination, upper support means; lower support means downwardly spaced from said upper support means and having a substantially horizontal bottom face; connecting means swingably suspending said lower support means from said upper support means for maintaining said bottom face substantially horizontal; motor means on said lower support means and having a substantially vertical driveshaft having a lower end; electromagnetic means secured to said lower end of said driveshaft below said bottom face of said lower support means, said electromagnetic means being adapted to releasably electromagnetically grip said lid, and said driveshaft being adapted to rotate said electromagnetic means about a substantially vertical axis whereby to rotate a lid gripped by said electromagnetic means for facilitating the removal of deposits from a seating surface of said lid; and means cooperating with said driveshaft for raising and lowering said electromagnetic means relative to said oven.

3. Apparatus as defined in claim 2 wherein said lower support means is disk-shaped and has a circumferential edge, and said connecting means comprises a plurality of rods uniformly spaced about said circumferential edge and a plurality of universal joints secured to the upper and lower ends of the respective rods and to said upper and lower support means, respectively, for permitting universal swinging movement of said lower support means relative to said upper support means.

4. Apparatus as defined in claim 2, further comprising cleaning means laterally of said support means and adapted to bear on said seating surface of said lid in a raised position thereof for removing said deposits therefrom during rotation of said lid.

5. Apparatus as defined in claim 4 wherein said cleaning means comprises at least a pair of arms on said apparatus and extending substantially vertically and laterally of said support means, each of said arms having a stationary portion and a pivotable portion secured thereto and tiltable toward and away from the seating surface of said lid and biasing means on each of said arms and connecting respective ones of said portions for urging the pivotable portions into engagement with said seating surface of said lid in the raised position of the latter.

6. Apparatus as defined in claim 5, further comprising means on said pivotable portions of said arms for releasably receiving a scraping means adapted to engage said seating surface of said lid, said arms further including means for adjustably positioning said scraping means relative to said seating surface of said lid.

7. Apparatus for manipulating a lid of an industrial oven comprising, in combination, upper support means; lower support means downwardly spaced from said upper support means and having a substantially horizontal bottom face; connecting means including a plurality of circumferentially equidistantly spaced elongated rods having upper and lower ends and respective universal joints thereon, said universal joints being respectively secured to said upper and lower support means and swingably suspending said lower support means from said upper support means for maintaining said bottom face substantially horizontal; motor means including gear means on said lower support means and having a substantially vertical driveshaft having a lower end; electromagnetic means secured to said lower end of said driveshaft below said bottom face of said lower support means, said electromagnetic means being adapted to releasably electromagnetically grip said lid, and said driveshaft being adapted to rotate said electromagnetic means about a substantially vertical axis whereby to rotate a lid gripped by said electromagnetic means for facilitating the removal of deposits from a seating surface of said lid; means cooperating with said driveshaft for raising and lowering said electromagnetic means relative to said oven, including rack means on said shaft upwardly of said lower end thereof, pinion means cooperating with said rack means, and means for rotating said pinion means for raising and lowering said shaft and moving said electromagnetic means into and out of engagement with said lid; and cleaning means laterally of said support means and comprising a plurality of arms each having an elongated substantially vertical portion and a pivotable portion secured thereto and tiltable into and out of engagement with said seating surface, scraping means on the respective pivotable portions adapted to scrape deposits from the seating surface of said lid, and biasing means on each of said arms connecting respective ones of said portions and urging said pivotable portions to tilt transversely of the direction of elongation of said elongated substantially vertical portions and into engagement with said seating surface of said lid in the raised position of the latter for removal of said deposits.

8. Apparatus as defined in claim 7, further comprising at least one projection formed on the underside of said electromagnetic means and adapted to engage a complementary recess in the top of said lid for centering said electromagnetic means relative to said lid.

9. Apparatus as defined in claim 7, further comprising means for successively reversing the direction of rotation of said electromagnetic means for imparting a reciprocating motion thereto describing at least part of a circle, the spacing of said arms being so selected as to enable said scraping means to reach all parts of said seating surface during said motion.

10. Apparatus as defined in claim 7, further comprising slip-ring means cooperating with said electromagnetic means for supplying current thereto.

11. Apparatus as defined in claim 7, further comprising means for automatically activating and deactivating said motor means rotating said electromagnetic means in dependence upon contact of said electromagnetic means with said lid.

References Cited by the Examiner

UNITED STATES PATENTS

| 1,609,919 | 12/1926 | Underwood | 214—18 |
|---|---|---|---|
| 2,981,423 | 4/1961 | Randell et al. | 214—18 |
| 3,120,668 | 11/1964 | Cook et al. | 15—21 |
| 3,160,573 | 12/1964 | Nepomniashtshy | 15—93.1 |

FOREIGN PATENTS 741,071  11/1955  Great Britain.

CHARLES A. WILLMUTH, *Primary Examiner.*

WALTER A. SCHEEL, *Examiner.*

L. G. MACHLIN, *Assistant Examiner.*